Aug. 1, 1950 M. GNOINSKY, SR 2,516,977
INSECT DESTROYING DEVICE
Filed Oct. 22, 1948 3 Sheets-Sheet 1

INVENTOR.
MICHAEL GNOINSKY, SR
BY
McMorrow, Berman+Davidson
ATTORNEYS.

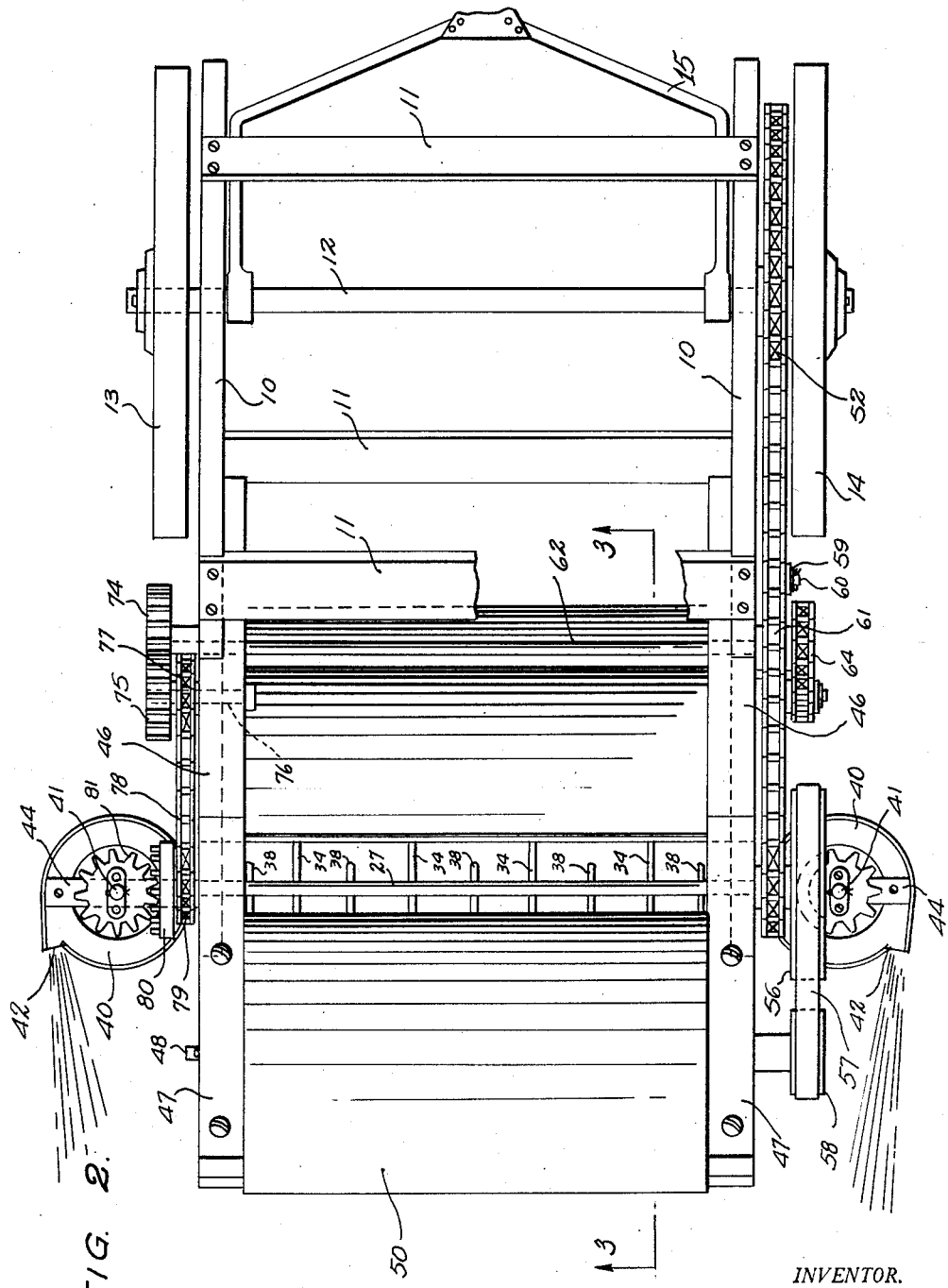

Aug. 1, 1950   M. GNOINSKY, SR   2,516,977
INSECT DESTROYING DEVICE
Filed Oct. 22, 1948   3 Sheets—Sheet 3
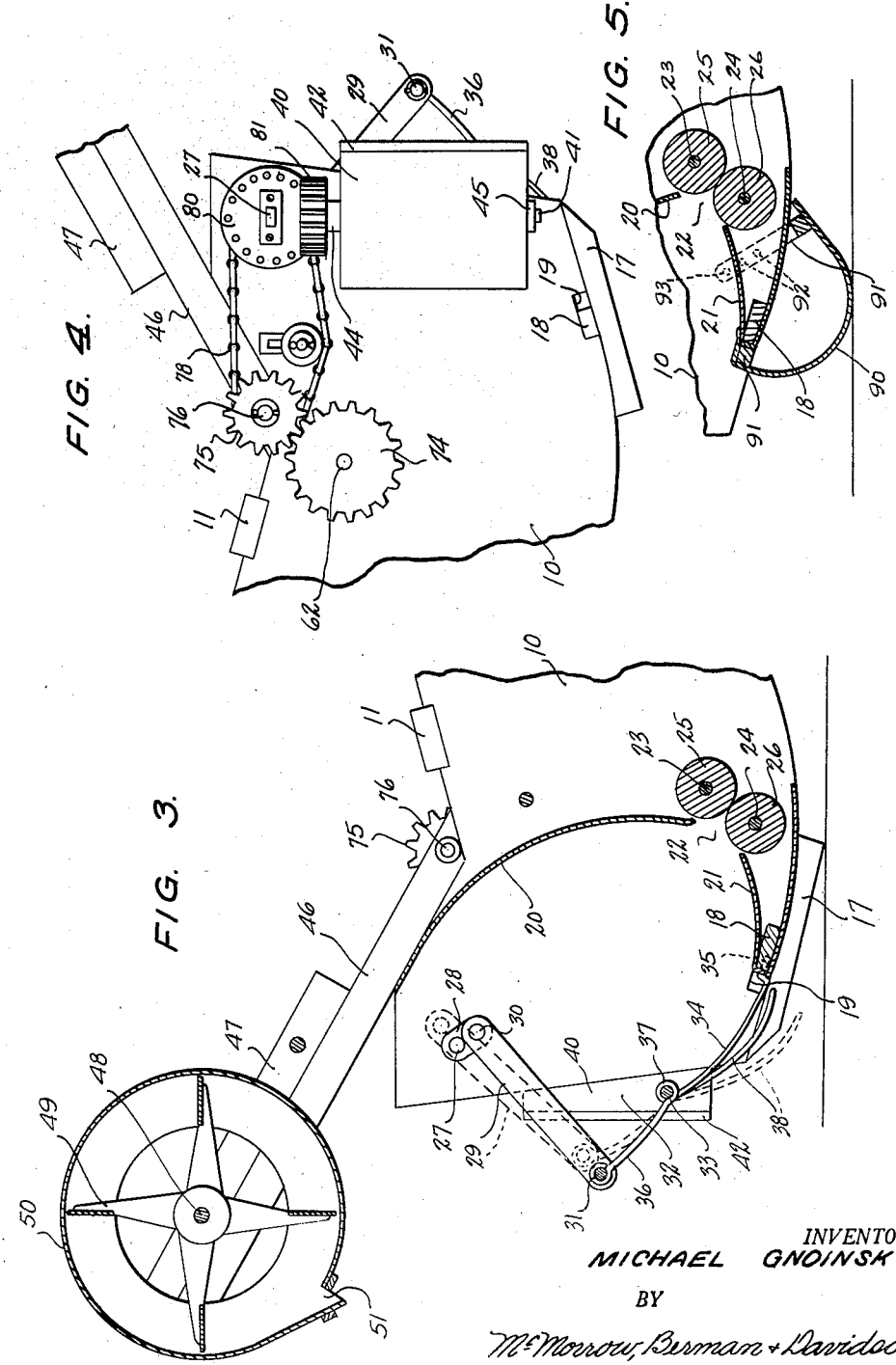
INVENTOR.
MICHAEL GNOINSKY, SR.
BY
McMorrow, Berman & Davidson
ATTORNEYS.

Patented Aug. 1, 1950

2,516,977

UNITED STATES PATENT OFFICE 2,516,977

INSECT-DESTROYING DEVICE

Michael Gnoinsky, Sr., Zeeland, N. Dak.

Application October 22, 1948, Serial No. 56,027

4 Claims. (Cl. 43—141)

My invention relates to insect-destroying devices, and more particularly to devices for destroying field insects which inhabit the vegetation of a field.

With the foregoing in view, it is an object of my invention to provide an improved insect-destroying device.

A further object is to provide an improved insect-destroying device which includes means adapted to be pushed across a field, means for disturbing insects in the path of the device, and means for forcing the disturbed insects into a destruction chamber carried by the device forwardly thereof.

A further object is to provide an improved insect-destroying device such as that last described and which includes air-blast-providing means directing wall-like blasts of air forwardly of opposite sides of the machine whereby to retard the lateral escape of insects in the path of the device.

A further object is to provide an improved insect-destroying device which includes means generating an air blast for blowing insects into the destruction chamber.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 2 is a plan view thereof;

Figure 3 is a longitudinal vertical sectional view taken along the line 3—3 of Figure 2;

Figure 4 is a fragmentary elevational view showing the opposite side of the machine as viewed from Figure 1;

Figure 5 is a fragmentary longitudinal vertical sectional view showing a portion of Figure 3, but illustrating a modified structure.

Figure 1:
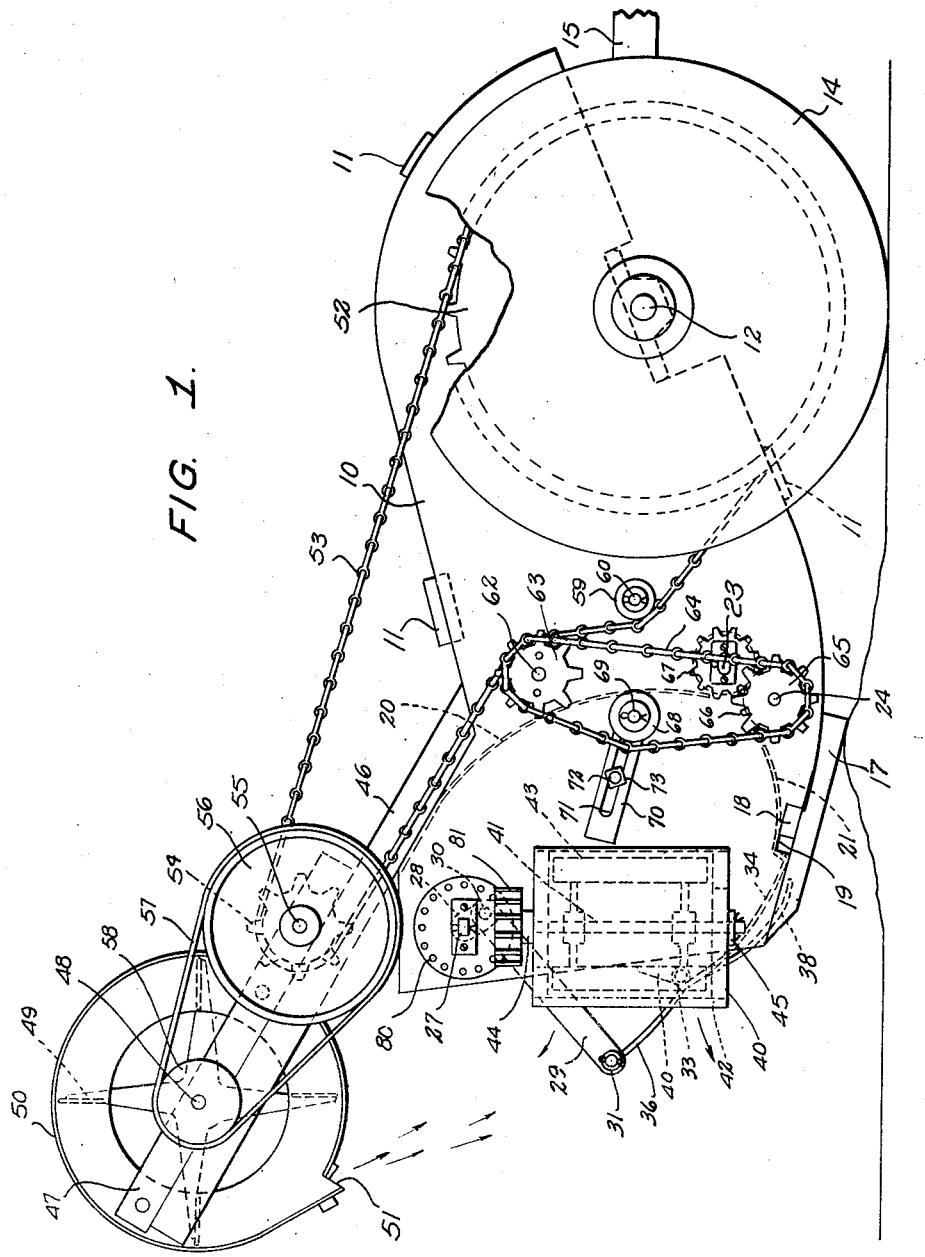
Figure 1 is an elevational view of the machine according to the invention.

Referring specifically to the drawings, wherein like reference characters have been used throughout the several views to designate like parts, the device according to the invention may comprise a pair of laterally-spaced, vertical side frame members 10 which are connected together in laterally-spaced relation by any suitable cross-frame members 11. An axle 12 is journaled in the side frame members 10 adjacent the rear end thereof and has mounted thereon a pair of ground-engaging wheels 13 and 14, whereby the rear end of the frame is supported on the ground. Any suitable hitch-providing means 15, Figure 1, may be connected to the side frame members 10 and extend rearwardly thereof for attachment to any suitable power-providing means for pushing the frame across a field. The forward lower edges of the side frame members 10 may be supported in slightly vertically-spaced relation to the surface of the ground by any suitable runners or shoes 17 which are detachably secured to such lower forward edges. Such shoes 17 overlie a front cross-frame member 18 connecting the front portions of the frame members 10 together and which member 18 is seated in notches 19 formed in the lower forward edges of the side frame members. As clearly seen in Figures 1, 3, 4 and 5, the front cross-frame member 18 does not entirely fill the notches 19, leaving a space forwardly thereof for a purpose to be described later. The forward part of the frame is formed to provide an insect-receiving hopper by means of a combined top and rear wall 20 which is arcuate in configuration and extends between the forward portions of the side frame members 10 rearwardly of the front edges thereof. A hopper floor 21 is likewise provided between the side frame members 10 and the forward edge of such floor may be secured to the forward frame member 18. The rear edges of the walls 20 and 21 are slightly spaced apart to provide a discharge opening 22 for insects received in the hopper. A pair of shafts 23 and 24 are journaled in the side frame members 10 and extend transversely thereof rearwardly of the discharge opening 22 for the hopper. Each of the shafts has mounted thereon a roller 25 and 26, the peripheries of which have a near rolling contact and provide a closure for the discharge opening 22. The shafts 23 and 24, together with the rollers 25 and 26, are driven by means to be described later, whereby insects passing through the discharge opening 22 must pass between the rollers and be crushed thereby. The crushed insects, after passage through the rollers 25 and 26, fall to the ground rearwardly of such rollers.

In the form of invention of Figures 1 to 4, inclusive, means have been provided for disturbing insects in the field forwardly of the hopper. As best seen in Figure 3, a crankshaft 27 extends transversely of the frame members 10 adjacent the forward upper portions thereof. The shaft 27 is adapted to be rotated by means to be described later, and is provided with a pair of crank arms 28 fixed thereon adjacent each frame member 10. The crank arms 28 are pivoted to pitmans 29 by crank pins 30. The forward ends of the pitmans 29 are pivoted to a cross-shaft 31 extending transversely of the hopper forwardly thereof. A pair of journals 32 are readily detachably secured to the forward edges of the side frame members 10 in any suitable manner, as by screws or bolts, not shown. The journals 32 mount therebetween a cross-shaft 33 which has secured thereto a plurality of laterally-spaced, rearwardly-directed, fixed guides 34 which preferably comprise wires. The rear ends of the guides 34 are upwardly offset and readily detachably seated in sockets 35 provided in the forward edge of the forward cross-frame member 18. A plurality of rearwardly-directed, laterally-spaced agitators 36 have their forward ends pivoted on the cross-shaft 31 and intermediate portions looped, as at 37, about the cross-shaft 33, whereby the agitators are pivotally mounted on the cross-shafts 31 and 33. The agitators 36 include a plurality of rearwardly-directed agitator fingers 38 which extend downwardly and rearwardly to terminate just forwardly of the cross-frame member 18. It follows from the foregoing that as the crankshaft 27 is rotated, the agitators 36 are rocked about the axes of the cross-shafts 31 and 33, whereby the agitator fingers 38 are reciprocated vertically, as indicated in broken lines, Figure 3. This action of the agitator fingers 38 serves to beat any vegetation growing in the field in the path of the hopper to disturb insects clinging thereto and cause them to fly or leap upwardly forwardly of the hopper. To retard lateral escape of such disturbed insects from the path of the hopper, and to force the insects into the hopper, means now to be described have been provided.

To prevent the escape of the disturbed insects from the path of the hopper in lateral directions, there has been provided a pair of blower housings 40 which are located on opposite sides of the hopper and supported by upper and lower brackets 44 and 45 which extend outwardly from the side frame members 10. The brackets 44 and 45 have vertical shafts 41 journaled therein and mount any suitable impeller blades 43 thereon inwardly of the housings 40. Each of the housings 40 is provided with a substantially vertically-disposed, forwardly-directed outlet nozzle 42 which is adapted to direct the wall-like blast of air forwardly of the hopper on either side thereof. The impellers 43 are driven by any suitable means to be described later, and the blasts from the blowers provide invisible walls of air retarding the escape of insects in the path of the device in lateral directions. As clearly seen in Figure 2, the nozzles 42 are slightly inwardly directed, whereby any insects encountering the blasts issuing from the nozzles will be blown laterally inwardly slightly so as to be retained in the path of the hopper.

To drive the disturbed insects into the hopper, there has been provided means now to be described. A pair of side frame extensions 46 extend forwardly and vertically relative to the side frame members 10. The extensions 46 are secured to the side frame members 10 in any suitable manner, not shown. Journal-providing members 47 are secured to the upper edges of the extensions 46 and have an impeller shaft 48 journaled thereon. Thus, the impeller shaft 48 extends transversely of the device upwardly and forwardly of the hopper. Any suitable impeller 49 is fixed to the shaft 48 for rotation therewith inwardly of a blower housing 50. The blower housing 50 is provided with an elongated discharge nozzle 51 which is downwardly and rearwardly directed into the hopper. Thus, as the agitator fingers 38 disturb the insects and cause them to leap or fly upwardly in the path of the machine, they are restrained from escaping laterally by the blasts of air from the blowers 40 and are driven into the hopper by the blast of air issuing through the nozzle 51. As in the first-described blowers, the elongated nozzle 51 provides a wall-like blast of air which is downwardly and rearwardly directed forwardly of the hopper. Thus, as the insects are disturbed, they are blown into the hopper and therein destroyed by the crushing action of the rollers 25 and 26.

Any suitable means may be provided for driving the rollers 25 and 26, the agitators 36 and the impeller shafts 41 and 48. In the embodiment shown, a sprocket 52 is fixed to the left-hand ground wheel 14 for rotation therewith as the device is rolled over the ground. A drive chain 53 is engaged with the sprocket 52 and passes over a smaller sprocket 54 fixed on a cross-shaft 55 journaled in the journal-providing member 47 of the extensions 46. A pulley 56 is likewise fixed on the cross-shaft 55 for rotation therewith and is connected by a belt 57 to a smaller pulley 58 fixed on the impeller shaft 48. As is apparent from Figure 1, the gearing described is a speed-increasing gearing, whereby comparatively slow rotation of the ground wheel 14 results in comparatively rapid rotation of the impeller 49. Thus, substantially strong blasts of air are discharged through the nozzle 51.

As best seen in Figures 1 and 2, the lower run of the drive chain 53 passes around an idler roller 59 journaled on a stub shaft 60 fixed to the left-hand side frame member 10. The effect of this arrangement is to offset a portion of the lower run of the chain 53 and cause the same to be forced into driving engagement with a sprocket 61 fixed on a stub shaft 62 likewise secured to or journaled in the left-hand side frame member 10. The shaft 62 likewise has fixed thereon an outer sprocket 63 which is connected by a chain 64 to a lower sprocket 65 fixed on the shaft 24 for the lowermost roller 26. The shaft 24 likewise has an externally-toothed spur gear fixed thereon inwardly of the sprocket 65, which spur gear 66 is in mesh with a spur gear 67 fixed on the shaft 23 for the uppermost crushing roller 25. Thus, the crushing rollers 26 and 25 are positively driven from the drive chain 53. A tensioning roller 68 is journaled on a stub shaft 69 fixed on a tensioning arm 70. The arm 70 is provided with a longitudinal slot 71 which slidably receives a threaded stud 72 fixed to the left-hand side frame member 10. A nut 73 on the end of the stud 72 will tighten the adjusting arm 70 in a selected adjusted position relative to the chain 64.

The countershaft 62 extends entirely across the machine and outwardly of the right-hand side frame member 10. As best seen in Figure 2, the right-hand end of the countershaft 62 has fixed thereon a pinion 74 which is in mesh with a smaller pinion 75 fixed on a stub shaft 76 journaled in the right-hand side frame member 10. The stub shaft 76 likewise has fixed thereon inwardly of the gear 75 a sprocket 77 which is connected by a chain 78 to a sprocket 79 fixed on the cross-shaft 27 aforesaid. The shaft 27 likewise has fixed on the opposite end thereof outwardly of the sprocket 79 on one side and outwardly of the left-hand side frame member 10 on the other side a gear 80 which is in constant mesh with a pinion 81 fixed on the upper end of each impeller shaft 41 for the blowers 40. It should be noted in this connection that the gear 75 is smaller than the pinion 74, while the sprocket 79 is smaller than the sprocket 77, whereby a speed-increasing gearing is provided between the countershaft 62 and the impeller shafts 41. Thus, the blasts from the blowers 40 are substantially strong in view of the increased speed of rotation thereof.

While I have shown and described a particular form of drive means for the several moving parts, it is obvious that other drive means may be provided.

Referring now to the modification of Figure 5, the structure and drive means is the same except that the agitators 36 and associated parts have been eliminated. This is readily accomplished by disconnecting the journals 40 from the front edges of the side frame members 10 and disconnecting the cross-shaft 31 and pitmans 29 from the crank pins 30. Thereafter the guides 34 are withdrawn from the sockets 35 of the front cross-member 18. With the agitators 36 and associated parts removed, a cross-skid 90 is substituted for the shoes 17, which are removed also. The skid 90 is preferably formed of sheet metal and is of trough-like configuration. The skid 90 is provided with a cross-frame member 91 which seats in that portion of the notch 19 not occupied by the front cross-frame member 18. The rear end of the skid 90 is supported with a pair of bracket arms 91 provided with a plurality of holes 92. Any suitable bolt 93 is inserted through one of the holes 92 and into a side frame member 10 to support the forward end of the hopper in a selected adjusted position relative to the surface of the ground. The purpose of this particular structure is to provide a device for use with the grasses, whereby to disturb insects inhabiting low-growing grasses and cause them to fly upwardly in the path of the hopper. Thereafter the grasses spring upwardly from their own resiliency without being damaged.

While I have shown and described what are now thought to be the preferred embodiments of the invention, it is to be understood that the same is susceptible of other forms and expressions. Consequently, I do not limit myself to the precise structures shown and described hereinabove except as hereinafter claimed.

I claim:

1. In an insect destroyer, a pair of vertically disposed frame members arranged in spaced relation, a horizontally disposed axle extending transversely of said frame members adjacent the lower ends thereof and journaled in said members, a transversely disposed hopper positioned adjacent the upper ends of said frame members forwardly of and spaced from said axle and carried by said frame members, said hopper having the inlet end facing the upper ends of said frame members and having the outlet end adjacent to and spaced from the lower ends of the latter, a pair of rotatable superimposed contacting rollers arranged transversely of said frame members adjacent to the outlet end of said hopper for receiving and crushing the insects discharged through the outlet end of said hopper, means extending transversely of said frame members arranged forwardly of said hopper and dependingly supported from said frame members for disturbing insects on vegetation on a ground surface adjacent thereto, a vertically disposed blower housing positioned adjacent to said hopper exteriorly of each of said frame members and spaced from each of said frame members, an impeller positioned within each of said housings and mounted for rotation about a vertical axis, each of said housings being provided with a discharge nozzle extending longitudinally thereof and facing away from said hopper for discharging a blast of air forwardly of said hopper, a horizontally disposed blower housing extending transversely of said frame members positioned above and forwardly of said vertically disposed blower housings and carried by said frame members, and an impeller positioned within said horizontally disposed blower housing and mounted for rotation about a horizontal axis, said horizontally disposed housing being provided with a discharge nozzle extending longitudinally thereof and facing toward said hopper for discharging a blast of air downwardly and forwardly of said hopper.

2. In an insect destroyer, a pair of vertically disposed frame members arranged in spaced relation, a horizontally disposed axle extending transversely of said frame members adjacent the lower ends thereof and journaled in said members, a transversely disposed hopper positioned adjacent the upper ends of said frame members forwardly of and spaced from said axle and carried by said frame members, said hopper having the inlet end facing the upper ends of said frame members and having the outlet end adjacent to and spaced from the lower ends of the latter, a pair of rotatable superimposed contacting rollers arranged transversely of said frame members adjacent to the outlet end of said hopper for receiving and crushing the insects discharged through the outlet end of said hopper, a plurality of agitator fingers extending transversely of said frame members arranged forwardly of said hopper and dependingly supported from said frame members for disturbing insects on vegetation on a ground surface adjacent thereto, a vertically disposed blower housing positioned adjacent to said hopper exteriorly of each of said frame members and spaced from each of said frame members, an impeller positioned within each of said housings and mounted for rotation about a vertical axis, each of said housings being provided with a discharge nozzle extending longitudinally thereof and facing away from said hopper for discharging a blast of air forwardly of said hopper, a horizontally disposed blower housing extending transversely of said frame members positioned above and forwardly of said vertically disposed blower housings and carried by said frame members, and an impeller positioned within said horizontally disposed blower housing and mounted for rotation about a horizontal axis, said horizontally disposed housing being provided with a discharge nozzle extending longitudinally thereof and facing toward said hopper for discharging a blast of air downwardly and forwardly of said hopper.

3. In an insect destroyer, a pair of vertically disposed frame members arranged in spaced relation, a horizontally disposed axle extending transversely of said frame members adjacent the lower ends thereof and journaled in said members, a transversely disposed hopper positioned adjacent the upper ends of said frame members forwardly of and spaced from said axle and carried by said frame members, said hopper having the inlet end facing the upper ends of said frame members and having the outlet end adjacent to and spaced from the lower ends of the latter, a pair of rotatable superimposed contacting rollers arranged transversely of said frame members adjacent to the outlet end of said hopper for receiving and crushing the insects discharged through the outlet end of said hopper, a skid extending transversely of said frame members arranged forwardly of said hopper and dependingly supported from said frame members for disturbing insects on vegetation on a ground surface adjacent thereto, a vertically disposed blower housing positioned adjacent to said hopper exteriorly of each of said frame members and spaced from each of said frame members, an impeller positioned within each of said housings and mounted for rotation about a vertical axis, each of said housings being provided with a discharge nozzle extending longitudinally thereof and facing away from said hopper for discharging a blast of air forwardly of said hopper, a horizontally disposed blower housing extending transversely of said frame members positioned above and forwardly of said vertically disposed blower housings and carried by said frame members, and an impeller positioned within said horizontally disposed blower housing and mounted for rotation about a horizontal axis, said horizontally disposed housing being provided with a discharge nozzle extending longitudinally thereof and facing toward said hopper for discharging a blast of air downwardly and forwardly of said hopper.

4. In an insect destroyer, a pair of vertically disposed frame members arranged in spaced relation, a horizontally disposed axle extending transversely of said frame members adjacent the lower ends thereof and journaled in said members, a transversely disposed hopper positioned adjacent the upper ends of said frame members forwardly of and spaced from said axle and carried by said frame members, said hopper having the inlet end facing the upper ends of said frame members and having the outlet end adjacent to and spaced from the lower ends of the latter, a pair of rotatable superimposed contacting rollers arranged transversely of said frame members adjacent to the outlet end of said hopper for receiving and crushing the insects discharged through the outlet end of said hopper, a plurality of agitator fingers extending transversely of said frame members arranged forwardly of said hopper and dependingly supported from said frame members for disturbing insects on vegetation on a ground surface adjacent thereto, runners arranged rearwardly of said fingers and below said frame members and secured to the latter for engaging said ground surface, a vertically disposed blower housing positioned adjacent to said hopper exteriorly of each of said frame members and spaced from each of said frame members, an impeller positioned within each of said housings and mounted for rotation about a vertical axis, each of said housings being provided with a discharge nozzle extending longitudinally thereof and facing away from said hopper for discharging a blast of air forwardly of said hopper, the horizontally disposed blower housing extending transversely of said frame members positioned above and forwardly of said vertically disposed blower housings and carried by said frame members, and an impeller positioned within said horizontally disposed blower housing and mounted for rotation about a horizontal axis, said horizontally disposed housing being provided with a discharge nozzle extending longitudinally thereof and facing toward said hopper for discharging a blast of air downwardly and forwardly of said hopper.

MICHAEL GNOINSKY, Sr.

REFERENCES CITED

The following references are of record in the file of this patent:

UNITED STATES PATENTS

| Number | Name | Date |
|---|---|---|
| 931,440 | Lindahl | Aug. 17, 1909 |
| 1,012,437 | Rea et al. | Dec. 19, 1911 |
| 1,489,214 | Hickman | Apr. 1, 1924 |
| 1,498,793 | Harris | June 24, 1924 |